March 3, 1959     D. A. CASEY     2,875,681
COFFEE MAKER
Filed May 24, 1957
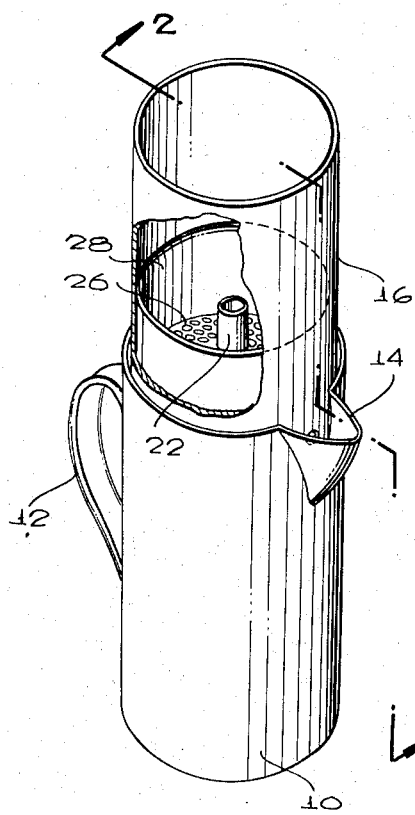
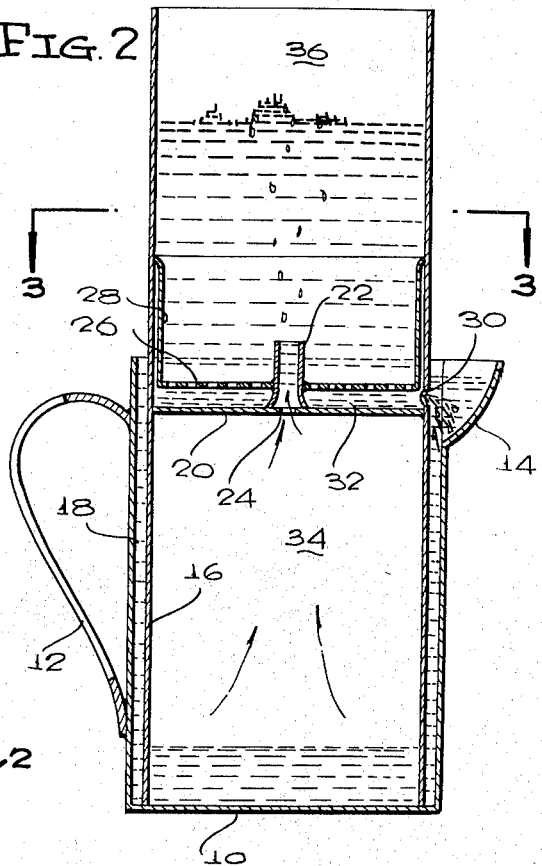
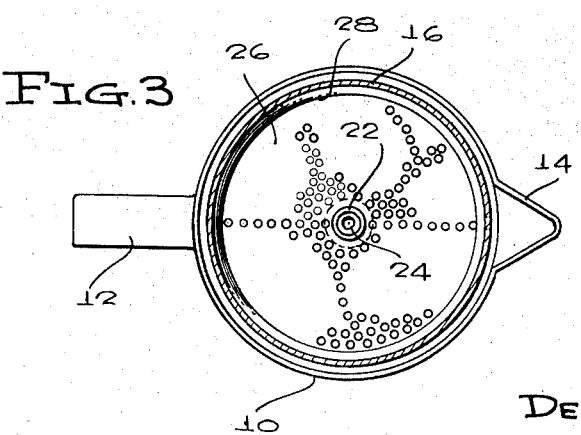
INVENTOR.
DENNIS A. CASEY
BY
McMorrow, Berman + Davidson
ATTORNEYS

United States Patent Office 2,875,681
Patented Mar. 3, 1959

2,875,681

COFFEE MAKER

Dennis Anderson Casey, New Orleans, La.

Application May 24, 1957, Serial No. 661,523

4 Claims. (Cl. 99—287)

This invention relates to coffee making devices, and has as its main purpose the obtaining of a more complete extraction of the active ingredients from ground coffee, by a thorough intermixture of the coffee and hot water, in an organization of components such that the mixture is kept in motion until the water and the dissolved material have been drained off from the coffee grounds. Summarized very briefly, the invention includes an outer container, and a cylindrical, open-ended inner container spaced from the wall of the outer container to define an annular chamber surrounding the inner container. The inner container is partitioned intermediate its ends, dividing the same into upper and lower chambers, and a basket for coffee grounds is disposed above the partition. A tube provides communication, through the basket, between the chambers in a manner such that air trapped in the lower chamber is forced under substantial pressure upwardly through the water and coffee mixture disposed in the upper chamber. In accordance with the invention, a space is provided between the bottom of the basket and the partition, and the liquid mixture, suitably filtered, is drained off to flow to the lower chamber through the annular space that surrounds the inner container.

The invention has as a more particular object the provision of a coffee maker which will insure the rapid, yet fully controlled making of coffee, through the provision of a plurality of simply designed, readily separated components.

Another object is to so design said components as to facilitate the maintenance thereof in a completely sanitary condition.

Still another object is to provide a coffee maker as described wherein the infusion of the mixture is accomplished by air which is heated while in a completely entrapped condition, under circumstances such that the air is caused to expand and be violently ejected through the mixture that is being infused, thereby effecting a quicker separation of the soluble materials from those that are substantially insoluble.

Still another object is to provide a coffee maker as described in which the initiation of the coffee making action takes place immediately after heat is initially applied, with the coffee being rapidly made.

Still another object is to provide a coffee maker of the character described that will be safe in operation, and will be adapted to make a substantial quantity of coffee within a receptacle which, though constituting one of the components of the coffee maker, also constitutes a serving pot of a basically conventional shape when considered per se.

Other objects will appear from the following description, the claims appended thereto, and from the annexed drawing, in which like reference characters designate like parts throughout the several views, and wherein:

Figure 1 is a perspective view of a coffee maker according to the present invention in which a portion has been broken away to show the inner details of construction;

Figure 2 is an enlarged longitudinal sectional view through the coffee maker; and Figure 3 is a transverse sectional view, on the same scale as Figure 2, taken substantially on line 3—3 of Figure 2.

Referring to the drawings in detail, designated at 10 is an outer container, which is of cylindrical, upwardly opening formation, and is of constant diameter fully from end to end thereof. The outer container 10 is provided with a handle 12, and with a pouring spout 14 diametrically opposite the handle. The outer container, thus, constitutes a serving pot when the making of the coffee has been completed.

An inner container 16 is also of constant diameter fully from end to end thereof, and as seen from Figure 2, the diameter of the inner container is appreciably less than that of the outer container, thus defining an annular chamber 18 surrounding the lower portion of the inner container, through the full length of that portion of the inner container that is housed within the outer container 10. The inner container, as seen from Figure 2, is of substantially greater height than the outer container, with the inner container being extended for almost half its length above the upper extremity of the outer container.

The inner container 16 includes a transverse, flat partition 20 located substantially medially between its opposite ends, and lying wholly in a plane normal to the longitudinal median or axis of the inner container. The partition 20, in the working relationship of the several components, is disposed in a plane slightly below the plane of the open top of the outer container.

Extending axially of the inner container is a tube 22 formed open at its opposite ends, with the lower end of the tube 22 being flared in a downward direction and being adapted to seat against the center portion of the partition 20, in concentric relation to a small port or orifice 24 formed in the partition.

A coffee grounds basket, removably seated within the upper portion of the inner container, is of upwardly opening, cup shape, and includes a planiform bottom wall 26 freely perforated over its full area, integral at its periphery with an upwardly projecting, cylindrical side wall 28 the upper end of which is flared outwardly to a slight degree and extends into contact with the side wall of the inner container 16, so as to prevent the passage of liquid exteriorly of the basket.

The tube 22 is fixedly secured within a center opening of the perforated bottom 26, so that the tube projects upwardly within the basket for approximately one-third the full height of the basket. The lower portion of the tube projects below the bottom 26, thus spacing the bottom 26 upwardly from the partition 20.

Communicating with the space between the perforated bottom 26 and partition 20 is a side orifice 30, formed to a small diameter and disposed in the side wall of the inner container 16 in communication with the annular chamber 18 that surrounds the lower portion of the inner container. The orifice 30 is in communication with the space 32 disposed between bottom 26 and partition 20, for a purpose to be made presently apparent.

As will be observed from Figure 2, the construction defines a lower chamber 34 in the inner container 16, disposed below the partition 20, and an upper chamber 36 in which the basket is disposed, and which is defined above the partition 20.

In use of the coffee maker, the several components are assembled in the manner shown in Figure 2. Then, ground coffee is placed within the basket and hot water is then poured onto the coffee.

The hot water passes through the coffee grounds, and then passes through the perforations of the basket bottom wall 26, into space 32. The water then passes through the port of orifice 30, into the annular, outer chamber 18.

After a small amount of water has entered the chamber 18, it will have surrounded the outer side of the inner container, thus trapping air in the lower chamber 34. This air must now pass through the opening or port 24. The hot water first heats the air, causing it to expand and be forced under substantial pressure through the restricted orifice 24. The air passes through the tube 22, and expands within the upper chamber 36, passing upwardly in the form of bubbles through the liquid and coffee mixture disposed within the upper chamber. This causes a high degree of turbulence in the mixture in the upper chamber, tending to create a rapid infusion of the water with the coffee, separating in a comparatively short time the readily soluble portions of the coffee grounds, from the indissoluble or more slowly soluble portions.

After the pressure within the inner chamber has been released, further pressure is created, as more liquid flows through the opening 30 and displaces the remaining air within the lower chamber.

Thus, a continuous supply of air is forced through the small opening 24, as long as liquid is entering the annular chamber 18. This continues until the operation of making the coffee is completed, with the liquid coffee being now disposed entirely within the annular chamber 18 and within the lower chamber 34. One need merely, then, lift the inner container out of the outer container, so that there is provided a serving pot, constituted by the outer container, in which serving pot the completed coffee mixture is confined, and from which said mixture can be readily poured.

Of course, it will be understood that means is provided that will permit water to flow from the annular chamber 18 into the chamber 34, under the lower end of the inner container 16. To this end, the inner container 16 may be provided with small spacers at its lower end, not shown, such as to define comparatively small openings at the lower end of the inner container, through which openings water is permitted to flow from the chamber 18 into the chamber 34. Then again, the comparative lightness of the inner container and the materials supported thereby, may be overcome by the pressure with which the air trapped in chamber 34 bears against the partition 20, so that a more or less continuous vibratory movement, so to speak, is imparted to the inner container, tending to cause it to move upwardly and downwardly upon the bottom of the outer container, to a sufficient extent to permit water to pass into the chamber 34 from the surrounding annular chamber 18.

As will be noted from Figure 2, the column of water in the chamber 18 should be higher than the column of water in the chamber 36. This is desirable, in view of the fact that otherwise, the entrapped air in chamber 34 might tend to be forced in a reverse direction, outwardly through the liquid contained in the chamber 18, instead of upwardly through the tube 22 as it is forced when the device is properly operating.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A coffee maker comprising an upwardly opening outer container; a cylindrical inner container seated in the outer container and formed intermediate its ends with a transverse partition, said partition defining upper and lower chambers in the inner container respectively located above and below the partition, the inner container having a side wall spaced inwardly from the side wall of the outer container, said side walls defining between them an annular chamber surrounding the inner container, the lower chamber and the annular chamber being in communication at their lower ends, said partition having a center orifice providing communication between the upper end of the lower chamber and lower end of the upper chamber, a tube extending upwardly in the upper chamber in engagement at its lower end with the partition about said orifice; and a coffee grounds basket within the inner container, having a perforated bottom wall through which the tube extends for disposition of the upper end of the tube within the basket, said bottom wall being spaced upwardly from the partition to define a lower space in the upper chamber therebetween, said basket seating snugly in the upper chamber and to define an upper space in the upper chamber into which the tube opens, said upper and lower spaces communicating with each other only through the perforated bottom wall of the basket, said inner container having an opening in its side wall communicating between the lower space and said annular chamber.

2. A coffee maker comprising an upwardly opening outer container; a cylindrical inner container seated in the outer container and formed intermediate its ends with a transverse partition, said partition defining upper and lower chambers in the inner container respectively located above and below the partition, the inner container having a side wall spaced inwardly from the side wall of the outer container, said side walls defining between them an annular chamber surrounding the inner container, the lower chamber and the annular chamber being in communication at their lower ends, said partition having a center orifice providing communication between the upper end of the lower chamber and lower end of the upper chamber, a tube extending upwardly in the upper chamber in engagement at its lower end with the partition about said orifice; and a coffee grounds basket within the inner container, having a perforated bottom wall through which the tube extends for disposition of the upper end of the tube within the basket, said bottom wall being spaced upwardly from the partition to define a lower space in the upper chamber therebetween, said basket seating snugly in the upper chamber to define an upper space in the upper chamber into which the tube opens, said upper and lower spaces communicating with each other only through the perforated bottom wall of the basket, said inner container having an opening in its side wall communicating between the lower space and said annular chamber, said inner container and basket being bodily removable from the outer container, the outer container having a spout for pouring of the brewed coffee therefrom following removal of the inner container.

3. A coffee maker comprising an upwardly opening outer container; a cylindrical inner container seated in the outer container and formed intermediate its ends with a transverse partition, said partition defining upper and lower chambers in the inner container respectively located above and below the partition, the inner container having a side wall spaced inwardly from the side wall of the outer container, said side walls defining between them an annular chamber surrounding the inner container, the lower chamber and the annular chamber being in communication at their lower ends, said partition having a center orifice providing communication between the upper end of the lower chamber and lower end of the upper chamber, a tube extending upwardly in the upper chamber in engagement at its lower end with the partition about said orifice; and a coffee grounds basket within the inner container, having a perforated bottom wall through which the tube extends for disposition of the upper end of the tube within the basket, said bottom wall being spaced upwardly from the partition to define a lower space in the upper chamber therebetween, said basket seating snugly in the upper chamber to define an upper space in the upper chamber into which the tube opens, said upper and lower spaces communicating with each other only through the perforated bottom wall of the basket, said inner container having an opening in its side wall communicating between the lower space and said annular chamber, said inner container extending above the upper end of the outer container, the partition lying in close proximity to the upper end of the outer container.

4. A coffee maker comprising an upwardly opening outer container; a cylindrical inner container seated in the outer container and formed intermediate its ends with a transverse partition, said partition defining upper and lower chambers in the inner container respectively located above and below the partition, the inner container having a side wall spaced inwardly from the side wall of the outer container, said side walls defining between them an annular chamber surrounding the inner container, the lower chamber and the annular chamber being in communication at their lower ends, said partition having a center orifice providing communication between the upper end of the lower chamber and lower end of the upper chamber, a tube extending upwardly in the upper chamber in engagement at its lower end with the partition about said orifice; and a coffee grounds basket within the inner container, having a perforated bottom wall through which the tube extends for disposition of the upper end of the tube within the basket, said bottom wall being spaced upwardly from the partition to define a lower space in the upper chamber therebetween, said basket seating snugly in the upper chamber to define an upper space in the upper chamber into which the tube opens, said upper and lower spaces communicating with each other only through the perforated bottom wall of the basket, said inner container having an opening in its side wall communicating between the lower space and said annular chamber, said inner container extending above the upper end of the outer container, the partition lying in close proximity to the upper end of the outer container, the perforated bottom wall also lying in close proximity to said upper end of the outer container, said upper chamber being of a size substantially equal to that of the lower chamber.

References Cited in the file of this patent
UNITED STATES PATENTS

| | | |
|---|---|---|
| 101,517 | Savage | Apr. 5, 1870 |
| 204,995 | Place | June 18, 1878 |
| 2,209,831 | Schurig | July 30, 1940 |
| 2,745,333 | Campbell | May 15, 1956 |